United States Patent Office 2,979,475
Patented Apr. 11, 1961

2,979,475

POTTING COMPOUND CONSISTING OF BUTYL METHACRYLATE POLYMER, PETROLATUM, AND HYDROGENATED CASTOR OIL

Richard L. Hudson, Washington, D.C., assignor to the United States of America as represented by the Secretary of the Navy No Drawing. Filed Oct. 18, 1949, Ser. No. 122,127

3 Claims. (Cl. 260—23)

The present invention relates to a composition, consisting of a mixture of chemical substances, for use as an insulating compound.

More specifically, it relates to a fusible composition of insulating material, consisting of butyl methacrylate, hydrogenated castor oil, known by the trade name "Opal Wax" and a suitable plasticizer, such as petroleum jelly or a chemically-analogous but normally liquid hydrocarbon mixture.

An object of the invention is to provide a composition of the above nature, for use as a potting compound.

Another object, also accomplished by use of the composition, is to provide a potting compound which is effective over a wide range of temperatures, without becoming too soft to be satisfactory in hot climates, or too brittle in cold weather.

The composition that has been found most satisfactory consists of 22.5% butyl methacrylate polymer, 22.5% liquid petrolatum and 55% Opal Wax.

These ingredients are melted together, and mixed thoroughly. The finished composition will pot satisfactorily when poured at 200° F.

The composition then is extremely viscous, but as it cools very slowly, it nevertheless penetrates satisfactorily through normally preheated amplifier bundles, such as are used in proximity fuzes, and which consists of tubes, resistors, capacitors, etc. This potting compound supports the components in place during storage and use of the fuze.

The new potting compound has much less shrinkage on solidifying and cooling, and smaller variations in its physical characteristics, such as softness and brittleness, at extremes of temperature, than the cerese composition heretofore used.

It will be understood that while deviations from the optium proportions given above will result in somewhat less desirable products, yet if the variations are not too great they will still be useful and better than the previously used composition. For example, while it would be undesirable to increase the proportion of Opal Wax, there is no great loss in effectiveness if less than 55% is used. Likewise, more than 22.5% of liquid petrolatum may be used, giving a somewhat softer product. In this connection it will be understood that petroleum jelly and liquid petrolatum are substantially equivalent to one another except that the liquid gives a somewhat softer product than the jelly, other things being equal. The term petrolatum as used in the claims is therefore to be understood to mean liquid petrolatum and/or petroleum jelly that is, a viscous liquid or jelly petroleum distillate fraction consisting solely of a mixture of hydrocarbons.

What is claimed is:

1. A composition consisting of butyl methacrylate polymer, and petrolatum, these two ingredients being mixed with a quantity of hydrogenated castor oil approximately equal to the sum of the first two ingredients.

2. A composition consisting of approximately one part each of butyl methacrylate polymer and petrolatum and approximately two parts of hydrogenated castor oil.

3. A composition consisting of 22.5% butyl methacrylate polymer, 22.5% petrolatum as a plasticizer and 55% hydrogenated castor oil.

References Cited in the file of this patent

UNITED STATES PATENTS 2,273,780    Dittmar _____ Feb. 17, 1942

OTHER REFERENCES

"The Chemistry and Technology of Waxes," by Warth, published 1947 by Reinhold Publishing Corp., New York, pages 216 and 278.